Figure 1:
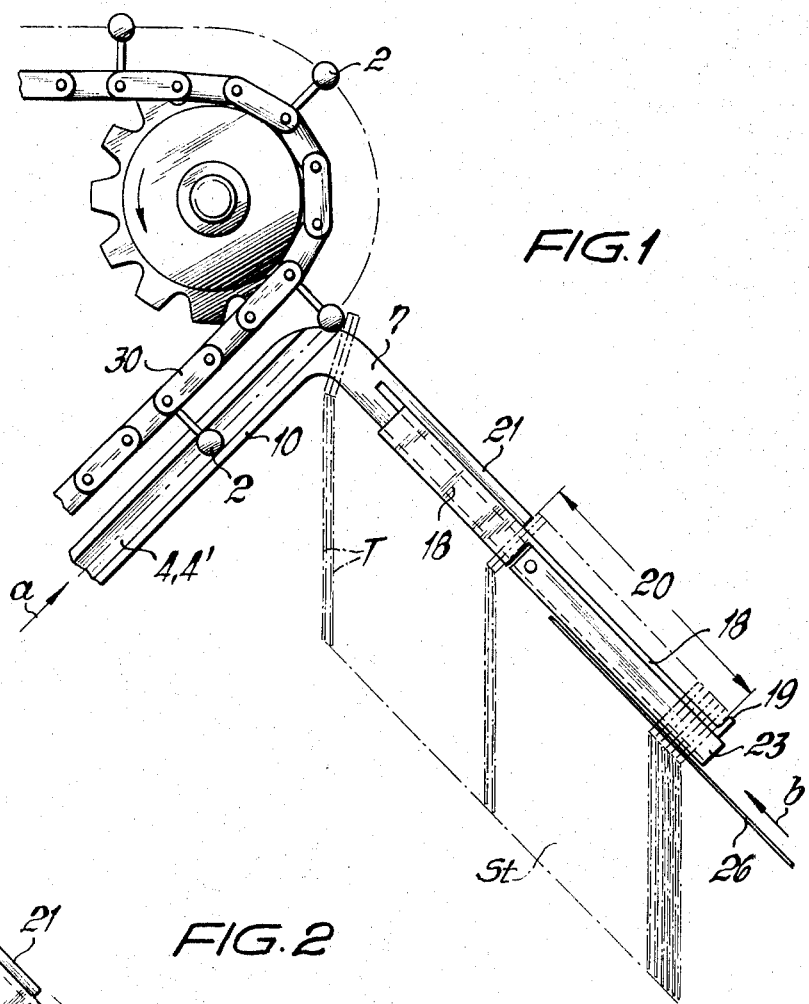

United States Patent [19]
Tetenborg

[11] 3,785,257
[45] Jan. 15, 1974

[54] APPARATUS FOR FORMING STACKS OF FLAT, APERTURED WORKPIECES

[75] Inventor: Konrad Tetenborg, Lengerich, Westphalia, Germany

[73] Assignee: Windmoller & Holscher, Lengerich, Westphalia, Germany

[22] Filed: Sept. 5, 1972

[21] Appl. No.: 286,324

[30] Foreign Application Priority Data
Sept. 8, 1971 Germany............. P 21 44 990.1

[52] U.S. Cl. ............ 93/93 HT, 83/95, 93/93 R, 193/32, 198/43, 214/8.5 K, 214/8.5 SS
[51] Int. Cl..... B65h 29/40, B31b 1/98, B65h 31/30
[58] Field of Search ........... 93/93 R, 93 HT, 93 DP, 93/35 H; 193/32; 214/8.5 R, 8.5 SS, 8.5 K; 198/174, 43, 45; 83/95, 94, 93, 89, 86, 84

[56] References Cited
UNITED STATES PATENTS

| | | | |
|---|---|---|---|
| 3,222,965 | 12/1965 | Hitchcock | 93/93 HT UX |
| 1,217,372 | 2/1917 | Vincent | 214/8.5 K X |
| 2,159,851 | 5/1939 | Hicks | 193/32 X |
| 3,424,113 | 1/1969 | Dickmann | 93/93 HT X |
| 1,881,868 | 10/1932 | Nelson | 83/95 X |
| 3,631,771 | 1/1972 | Schwarzkopf et al. | 93/93 DP |

Primary Examiner—Andrew R. Juhasz
Assistant Examiner—James F. Coan
Attorney—Martin Fleit et al.

[57] ABSTRACT

The workpieces are successively threaded onto a mandrel and are removed from the same as a stack. The mandrel is carried by and freely suspended from stack flights, which are mounted on a revolving flight conveyor and engage bearing surfaces of the mandrel from below. The pitch of the flights on the flight conveyor is selected so that workpieces can be threaded on the receiving end of the mandrel between any two successive flights. The delivery end of the mandrel is angled downwardly behind the position where the flights of the flight conveyor leave the bearing surface of the mandrel. The downwardly angled portion of the mandrel is provided at its end with a stop bar, which is slidably mounted and can be fixed in position and has an upwardly directed stop nose, which defines with the delivery end of the mandrel a step in a length which can be adjusted as desired. A guide rail extending in the longitudinal direction of the stop bar is pivoted to the stop bar at that end of the guide rail which is remote from the stop nose, for an up and down movement. The stop nose protrudes over the guide rail when the same is in its lower end position. The guide rail in its upper end position extends obliquely to the stop bar and with its free end protrudes over the stop nose.

2 Claims, 7 Drawing Figures

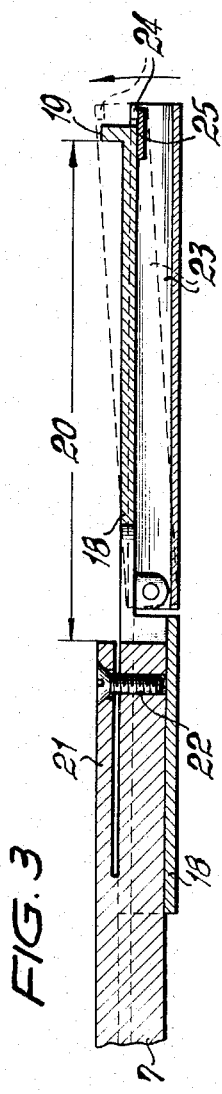
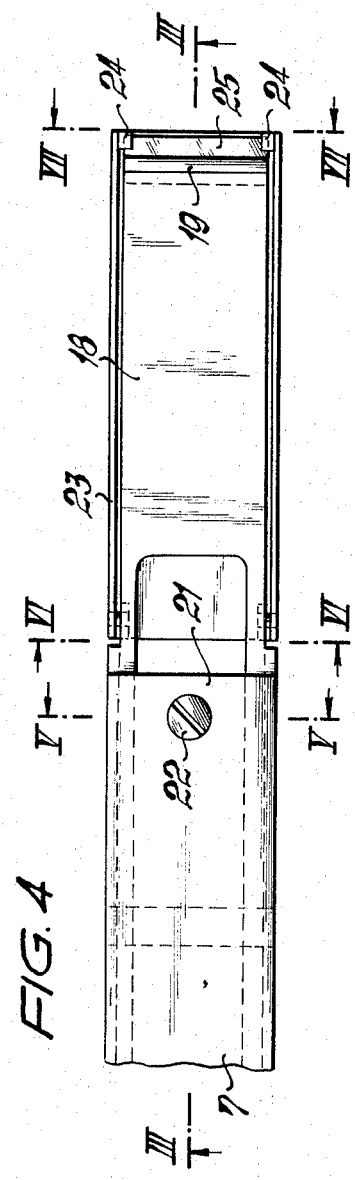
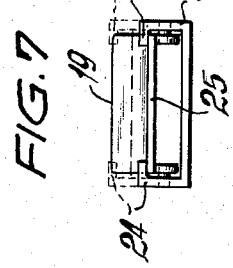
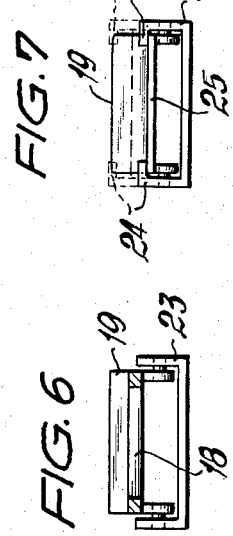
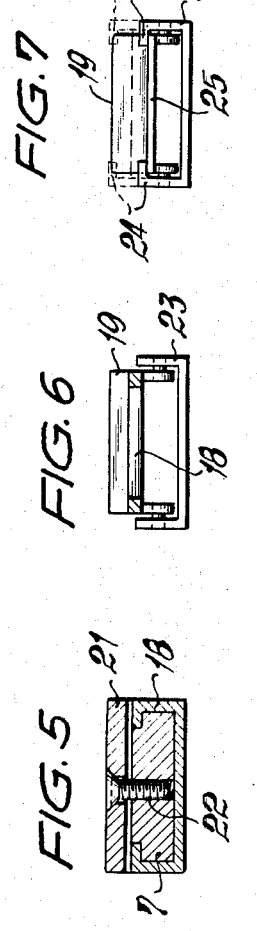

APPARATUS FOR FORMING STACKS OF FLAT, APERTURED WORKPIECES

In the U.S. Pat. Application Ser. No. 243,296 filed Apr. 12, 1972, an apparatus has been disclosed which serves to form stacks of flat, apertured workpieces, preferably carrying bags having gripping apertures. In that apparatus, the workpieces are successively threaded onto a mandrel and are removed from the same as a stack. The mandrel is carried by and freely suspended from stack flights, which are mounted on a revolving flight conveyor and engage bearing surfaces of the mandrel from below. The pitch of the flights on the flight conveyor is selected so that workpieces can be threaded on the receiving end of the mandrel between any two successive flights. In a particularly desirable embodiment of the apparatus disclosed in the above-mentioned prior application, the delivery end of the mandrel is angled downwardly behind the position where the flights of the flight conveyor leave the bearing surfaces of the mandrel, and the downwardly angled portion of the mandrel is provided at its end with a stop bar, which is slidably mounted and can be fixed in position and has an upwardly directed stop nose, which defines, with the delivery end of the mandrel a step in a length which can be adjusted as desired.

Where this stop is provided, the user can adjust the length of the stop so that predetermined numbers of closely adjoining carrying bags on said step and can remove the resulting stack of carrying bags by hand over the stop nose from the stop bar. In that case, however, the thickness of the stack of carrying bags is limited by the fact that the operator must be capable of reliably gripping the stack between the thumb and index finger.

It is an object of the invention so to design the above-described embodiment of the apparatus according to the above-mentioned prior application that stacks of carrying bags in any desired thickness can be removed from the stop bar.

This object is accomplished according to the invention in that a guide rail extending in the longitudinal direction of the stop bar is provided to the stop bar at that end of the guide rail which is remote from the stop nose, for an up and down movement, the stop nose protrudes over the guide rail when the same is in its lower end position, and the guide rail in its upper end position extends obliquely to the stop bar and with its free end protrudes over the stop nose.

Under the action of gravity, the guide rail tends to assume its lower end position, in which the stop nose protrudes therefrom so that the carrying bags arriving on the delivery portion of the mandrel are collected on the step formed by the stop bar. When the guide rail is raised above the stop nose, the resulting stack can be stripped off onto a strip of cardboard, which has previously been inserted under the guide rail through the gripping apertures of the carrying bags forming the stack. When the cardboard strip is then closed to form a ring, the stack of carrying bags is held together. In this way, stacks of carrying bags in any desired number can be conveniently removed from the mandrel and bundled.

According to a further embodiment of the invention, the guide rail is preferably an open-topped channel and the stop bar extends in the opening of the guide rail. This design results in large surfaces for guiding and engaging the cardboard strip as it is inserted through the gripping apertures of the carrying bags collected on the step, and a good guidance of the carrying handles on both sides on the lateral flanges of the guide rail so that a lateral swinging of individual carrying bags from the stack will be reliably avoided as the stack is stripped.

The invention will be explained more fully in the following description with reference to the drawing, which shows an embodiment by way of example.

Figure 2:
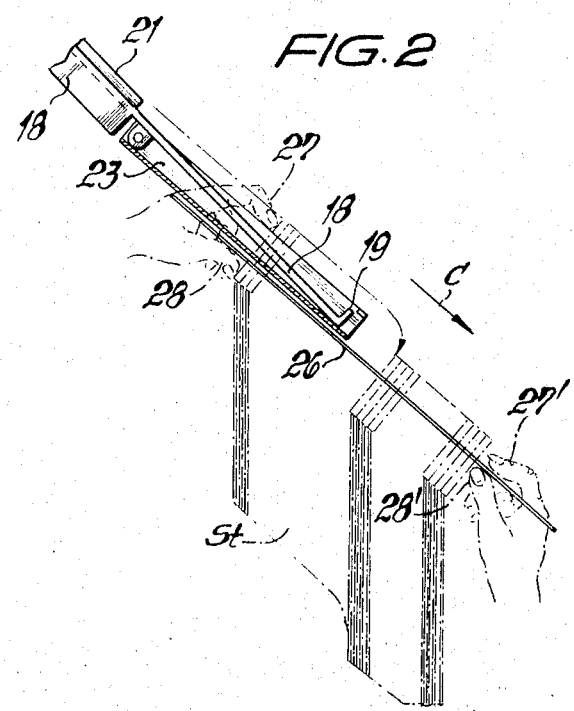

In the drawing,

FIG. 1 is a side elevation showing the delivery end of the stacking apparatus disclosed in the above-mentioned prior application, together with the means provided according to the invention at the delivery end of the mandrel, during the formation of a stack of carrying bags, FIG. 2 shows the delivery end means of FIG. 1 during the removal of the stack of carrying bags, FIG. 3 is an enlarged longitudinal sectional view taken on line IV—IV of FIG. 4 and showing the delivery end means, FIG. 4 is a top plan view showing the delivery end means of FIG. 3, FIG. 5 is a transverse sectional view taken on line V—V in FIG. 4 and showing the delivery end means, FIG. 6 is a transverse sectional view taken on line VI—VI in FIG. 4 and showing the delivery end means, and FIG. 7 is an end view showing the delivery end means as viewed on line VII—VII in FIG. 4.

The drawing shows the delivery end of the stacking apparatus disclosed in the above-mentioned prior application. The mandrel 10 is freely suspended from the flights 2 of the flight conveyor 30, which advances the carrying bags T on the mandrel. The mandrel 10 has a downwardly angled delivery end portion 7, which supports the carrying bags and is received by their gripping apertures as soon as the flights 2 leave the lateral grooves 4, 4' of the mandrel 10 in the direction of travel a.

A stop bar 18 is adapted to be inserted into the end of the delivery end portion 7. At its free end, the stop bar 18 is provided with an upright stop nose 19. The stop bar together with the end of the delivery end portion 7 and the stop nose 19 forms a step 20, the length of which can be varied as desired in that the stop bar is pushed more or less into the delivery end portion. As is shown in FIGS. 3 and 4, the stop bar 18 has the form of a sleeve at the end at which it is inserted and can be clamped to the delivery end portion in any desired depth of insertion by means of the clamp tongue 21 and the clamp screw 22.

A guide rail 23 extends in the longitudinal direction of the stop bar 18. At its end remote from the stop nose 19, the guide rail 23 is pivoted to the stop bar 18 for an up and down movement. The guide rail is arranged so that in its lower end position, shown in solid lines in FIGS. 1 and 3, the guide rail exposes the stop nose 19, whereas in its upper end position, indicated in phantom, the guide rail extends obliquely to the stop bar 18 and with its free end protrudes over the stop nose. As is apparent from FIGS. 6 and 7, the guide rail 23 is channel-shaped and is pivoted to the stop bar so that the latter extends in the opening at the top of the guide rail. The above-mentioned lower end position of the guide rail is defined in that the stop noses 24 come to rest on an extension 25 of the guide bar 18. The upper end position is defined by the guide engagement of the web of the channel-shaped guide rail with the underside of the free end portion of the stop bar 18.

The stop bar 18 is inserted into the delivery end 7 of the mandrel 10 to such an extent, that the step 20 cannot receive more than the number of carrying bags desired in the stack when the carrying handles on the step closely adjoin each other. The stop bar 12 is clamped fast in that position.

As the step 20 receives the arriving carrying bags, the guide rail assumes its lower end position, shown in FIG. 1, under the action of gravity. In this position the guide rail exposes the stop nose 19 so that the same can intercept the carrying bags. As soon as the step 20 has been filled with a stack St of carrying bags, in dependence on its length, as shown in FIG. 1, the operator inserts a cardboard strip 26 below the guide rail 23 in the direction *b* through all gripping apertures of the carrying bags disposed on the step 20, and, as indicated in FIG. 2, yieldably holds with the thumb 27 and index finger 28 of one hand the cardboard strip at the end which has been moved through the gripping hand, whereas with the thumb 27' and index finger 28' of the other hand the operator grips the cardboard strip 26 at its end protruding over the stop bar 18. As is indicated in FIG. 2, the operator then lifts the protruding end of the cardboard strip with the fingers 27', 28' to move the guide rail 23 to its upper inclined position, in which the guide rail 19 protrudes over the stop nose. The operator then strips off the stack St of carrying bags in the direction *c* over the guide rail onto the cardboard strip 26. The ends of the cardboard strip 26 are then joined at its ends with adhesive or a staple so as to form a ring which holds the stack of carrying bags together.

What is claimed is:

1. An apparatus for forming stacks of flat, apertured workpieces, preferably of carrying bags having gripping apertures, in which apparatus the workpieces are successively threaded onto a mandrel and are removed from the same as a stack, the mandrel is carried by and freely suspended from stack flights, which are mounted on a revolving flight conveyor and engage bearing surfaces of the mandrel from below, the pitch of the flights on the flight conveyor is selected so that workpieces can be threaded on the receiving end of the mandrel between any two successive flights, the delivery end of the mandrel is angled downwardly immediately behind the point where the flights of the flight conveyor leave the bearing surfaces of the mandrel, and the downwardly angled portion of the mandrel is provided at its end with a stop bar (18), which is slidably mounted and can be fixed in position and has an upwardly directed stop nose (19), which defines with the delivery end of the mandrel a step in a length which can be adjusted as desired, characterized in that a guide rail (23) extending in the longitudinal direction of the stop bar (18) is pivoted to the stop bar at that end of the guide rail which is remote from the stop nose, for an up and down movement, the stop nose (19) protrudes over the guide rail when the same is in its lower position, and the guide rail in its upper end position extends obliquely to the stop bar and with its free end protrudes over the stop nose.

2. An apparatus as set forth in claim 1, characterized in that the guide rail (23) is an open-topped channel member and the stop bar (18) extends in the opening of the guide rail.

* * * * *